(12) United States Patent
Aoki

(10) Patent No.: US 9,598,072 B2
(45) Date of Patent: Mar. 21, 2017

(54) HYBRID VEHICLE AND CONTROL METHOD THEREOF

(71) Applicant: Takanori Aoki, Nissin (JP)

(72) Inventor: Takanori Aoki, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/254,064

(22) Filed: Apr. 16, 2014

(65) Prior Publication Data

US 2014/0316624 A1 Oct. 23, 2014

(30) Foreign Application Priority Data

Apr. 19, 2013 (JP) .................. 2013-088396

(51) Int. Cl.
| | |
|---|---|
| *B60L 11/00* | (2006.01) |
| *B60W 20/00* | (2016.01) |
| *B60W 10/30* | (2006.01) |
| *B60H 1/00* | (2006.01) |

(52) U.S. Cl.
CPC ..... *B60W 20/1086* (2013.01); *B60H 1/00764* (2013.01); *B60H 1/00885* (2013.01); *B60H 1/00899* (2013.01); *B60W 10/30* (2013.01); *B60W 20/18* (2016.01); *B60W 2560/04* (2013.01); *Y10S 903/93* (2013.01)

(58) Field of Classification Search
CPC ....... B60H 1/004; B60W 10/06; B60W 10/08; B60W 10/30; B60W 20/40; B60W 20/1086; B60W 2560/04; Y02T 10/6239; Y02T 10/6286; Y02T 10/7005; Y02T 10/7077; Y02T 10/62; Y02T 10/6204; Y02T 10/6213; Y02T 10/7283; Y02T 50/64; Y10S 903/93
USPC .......................................... 701/22
See application file for complete search history.

(56) References Cited

U.S. PATENT DOCUMENTS

| | | |
|---|---|---|
| 7,240,660 B1 | 7/2007 | Bryant et al. |
| 7,980,342 B2 * | 7/2011 | Andri .................. B60L 11/123 123/480 |
| 8,181,629 B2 | 5/2012 | Pursifull et al. |

(Continued)

FOREIGN PATENT DOCUMENTS

| | | |
|---|---|---|
| CN | 102923016 A | 2/2013 |
| EP | 2599654 A1 | 6/2013 |

(Continued)

OTHER PUBLICATIONS

Office Action issued in U.S. Appl. No. 14/219,341 on Feb. 12, 2015.

(Continued)

*Primary Examiner* — Muhammad Shafi
(74) *Attorney, Agent, or Firm* — Andrews Kurth Kenyon LLP

(57) ABSTRACT

An ECU determines whether or not fuel in a fuel tank deteriorates. A heating system is configured to be able to perform heating (engine heating) using heat of an engine which heating uses the engine under operation as a heat source, and heating (heat-pump heating) using a heat pump cycle without using the engine as a heat source. When it is determined that the fuel in the fuel tank deteriorates, the ECU controls the heating system and the engine so as to give priority to the engine heating over the heat-pump heating.

11 Claims, 8 Drawing Sheets

(56) References Cited

U.S. PATENT DOCUMENTS

| | | |
|---|---|---|
| 8,612,092 B2 | 12/2013 | Okamoto et al. |
| 2003/0127528 A1* | 7/2003 | Sabhapathy ............. B60H 1/04 237/12.3 B |
| 2005/0044873 A1 | 3/2005 | Tamai et al. |
| 2009/0321159 A1* | 12/2009 | Andri .................... B60L 11/123 180/65.25 |
| 2010/0076663 A1 | 3/2010 | Jinno et al. |
| 2010/0186702 A1 | 7/2010 | Yaccarino |
| 2010/0198438 A1 | 8/2010 | Iraha et al. |
| 2010/0305794 A1 | 12/2010 | Foster |
| 2010/0312425 A1 | 12/2010 | Obayashi et al. |
| 2011/0048671 A1* | 3/2011 | Nishikawa ......... B60H 1/00885 165/42 |
| 2011/0066352 A1 | 3/2011 | Blanchard et al. |
| 2011/0166729 A1 | 7/2011 | Tabatowski-Bush |
| 2012/0216767 A1 | 8/2012 | Ulrey et al. |
| 2013/0030616 A1 | 1/2013 | Syed et al. |
| 2013/0041534 A1 | 2/2013 | Kim |
| 2013/0144519 A1 | 6/2013 | Nakano et al. |
| 2013/0151056 A1 | 6/2013 | Nakano |
| 2013/0173106 A1 | 7/2013 | Konishi |
| 2013/0197749 A1 | 8/2013 | Martini et al. |
| 2013/0211641 A1* | 8/2013 | Fujii .................... B60W 10/06 701/22 |
| 2014/0058647 A1 | 2/2014 | Haladyna et al. |
| 2014/0083377 A1 | 3/2014 | Jo et al. |
| 2014/0109872 A1 | 4/2014 | Porras et al. |
| 2014/0110489 A1 | 4/2014 | Yasui |
| 2014/0288740 A1* | 9/2014 | Itoyama ................ B60W 10/06 701/22 |
| 2014/0288741 A1 | 9/2014 | Oonishi et al. |
| 2014/0316624 A1 | 10/2014 | Aoki |

FOREIGN PATENT DOCUMENTS

| | | |
|---|---|---|
| EP | 2619024 B1 | 12/2014 |
| JP | 2005-163702 A | 6/2005 |
| JP | 2008296646 A | 12/2008 |
| JP | 2009-255680 A | 11/2009 |
| JP | 2010-018128 A | 1/2010 |
| JP | 2010-280335 A | 12/2010 |
| JP | 2011235849 A | 11/2011 |
| JP | 2012-030668 A | 2/2012 |
| JP | 2012066716 A | 4/2012 |
| JP | 2012-166777 A | 9/2012 |
| JP | 2013-018420 A | 1/2013 |
| WO | 2009128355 A1 | 10/2009 |
| WO | 2012014845 A1 | 2/2012 |

OTHER PUBLICATIONS

Office Action issued on Jul. 1, 2015, in U.S. Appl. No. 14/219,341.
Dffice Action issued to U.S. Appl. No. 14/219,428 on Mar. 23, 2015.
Office Action issued in U.S. Appl. No. 14/219,428 on Aug. 9, 2016.
Notice of Allowance issued in U.S. Appl. No. 14/219,428 on Mar. 23, 2016.
Notice of Allowance dated Dec. 30, 2016, in US. Appl. No. 14/219,428.

* cited by examiner

HYBRID VEHICLE AND CONTROL METHOD THEREOF

INCORPORATION BY REFERENCE

The disclosure of Japanese Patent Application No. 2013-088396 filed on Apr. 19, 2013 including the specification, drawings and abstract is incorporated herein by reference in its entirety.

BACKGROUND OF THE INVENTION

1. Field of the Invention

The present invention relates to a hybrid vehicle and a control method thereof, and particularly, relates to a control technique of a hybrid vehicle including an electric motor that generates a running driving force, an internal combustion engine, and a heating system that heats a passenger compartment.

2. Description of Related Art

Japanese Patent Application Publication No. 2010-280335 (JP 2010-280335 A) describes a hybrid vehicle including a first heating apparatus that heats a passenger compartment by use of heat of an internal combustion engine, and a second heating apparatus that uses a heat pump. In the hybrid vehicle, it is determined which one of the first heating apparatus and the second heating apparatus is used based on a comparison in magnitude between a cost in a case where the first heating apparatus is used and a cost in a case where the second heating apparatus is used.

A hybrid vehicle including an electric motor that generates a running driving force is able to run while an internal combustion engine is stopped. Particularly, in a so-called plug-in hybrid vehicle in which a power storage device in which to store electric power to be supplied to an electric motor is chargeable from a power supply outside the vehicle, a running range during stopping of an internal combustion engine is enlarged, so that the internal combustion engine can be stopped for a long term. Thus, the hybrid vehicle has a concern that fuel deteriorates due to the fuel being left in a fuel tank for a long term.

The hybrid vehicle described in JP 2010-280335 A is useful in that a cost required for heating is reducible, but it is difficult to satisfy a user request to restrain deterioration of the fuel while heating is performed.

SUMMARY OF THE INVENTION (US)

The present invention provides a hybrid vehicle that is able to satisfy a user request to restrain deterioration of fuel while heating is performed.

Further, the present invention provides a control method of a hybrid vehicle that is able to satisfy a user request to restrain deterioration of fuel while heating is performed.

According to the present invention, a hybrid vehicle includes: an electric motor configured to generate a running driving force; an internal combustion engine; a heating system configured to heat a passenger compartment; and an electric control unit configured to: (a) detect deterioration of fuel to be supplied to the internal combustion engine, and (b) control the electric motor, the internal combustion engine, and the heating system. The heating system includes a first heating apparatus that is configured to use the internal combustion engine under operation as a heat source, and a second heating apparatus that is configured to not use the internal combustion engine as a heat source. When the electric control unit detects the deterioration of the fuel, the electric control unit controls the heating system and the internal combustion engine so as to give priority to heating by the first heating apparatus over heating by the second heating apparatus.

When the electric control unit detects the deterioration of the fuel during stopping of the internal combustion engine, the electric control unit may control the heating system and the internal combustion engine so as to start the internal combustion engine and give priority to the heating by the first heating apparatus over the heating by the second heating apparatus.

When the electric control unit detects a fuel deterioration degree is large, the electric control unit may control the heating system and the internal combustion engine so as to give more priority to the heating by the first heating apparatus over the heating by the second heating apparatus, in comparison with a case where the fuel deterioration degree is small.

Further, the electric control unit may detect the fuel deterioration degree based on an elapsed time after refueling is performed.

The electric control unit may lengthen time before the deterioration of the fuel is detected, as more fuel remains.

When the deterioration of the fuel is not detected by the electric control unit, the electric control unit may control the heating system and the internal combustion engine so as to use efficient one of the heating by the first heating apparatus and the heating by the second heating apparatus.

Further, when the internal combustion engine operates, the electric control unit may determine that the heating by the first heating apparatus is more efficient than the heating by the second heating apparatus.

Further, when the internal combustion engine stops, the electric control unit may determine that the heating by the second heating apparatus is more efficient than the heating by the first heating apparatus.

When a request output to the vehicle exceeds a predetermined threshold, the internal combustion engine operates. The electric control unit is configured such that, when the internal combustion engine operates, the electric control unit controls the heating system and the internal combustion engine so as to give priority to the heating by the first heating apparatus over the heating by the second heating apparatus, and when the internal combustion engine stops, the electric control unit controls the heating system so as to give priority to the heating by the second heating apparatus over the heating by the first heating apparatus. The electric control unit detects a fuel deterioration degree. When the fuel deterioration degree is large, the electric control unit sets the threshold to be smaller than the threshold at the time when the fuel deterioration degree is small.

The second heating apparatus performs heating by use of a heat pump. The hybrid vehicle may further include: a power storage device configured to store electric power to be supplied to the electric motor; and a charging device configured to receive electric power from a power supply outside the vehicle and charges the power storage device.

Further, according to the present invention, a control method is a control method of a hybrid vehicle. The hybrid vehicle includes an electric motor configured to generate a running driving force, an internal combustion engine, a heating system configured to heat a passenger compartment, and an electronic control unit. The heating system includes a first heating apparatus that is configured to use the internal combustion engine under operation as a heat source, and a second heating apparatus that is configured not to use the internal combustion engine as a heat source. The control method includes a step of detecting, by the electronic control unit, deterioration of fuel to be supplied to the internal combustion engine; and a step of, when the deterioration of the fuel is detected, giving, by the electronic control unit, priority to heating by the first heating apparatus over heating by the second heating apparatus.

According to the present invention, when the deterioration of the fuel is detected, the heating by the first heating apparatus that is configured to use the internal combustion engine under operation as a heat source is given priority over the heating by the second heating apparatus that is configured not to use the internal combustion engine. This makes it possible to satisfy a user request to restrain the deterioration of the fuel while heating is performed. As a result, marketability of the vehicle improves.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
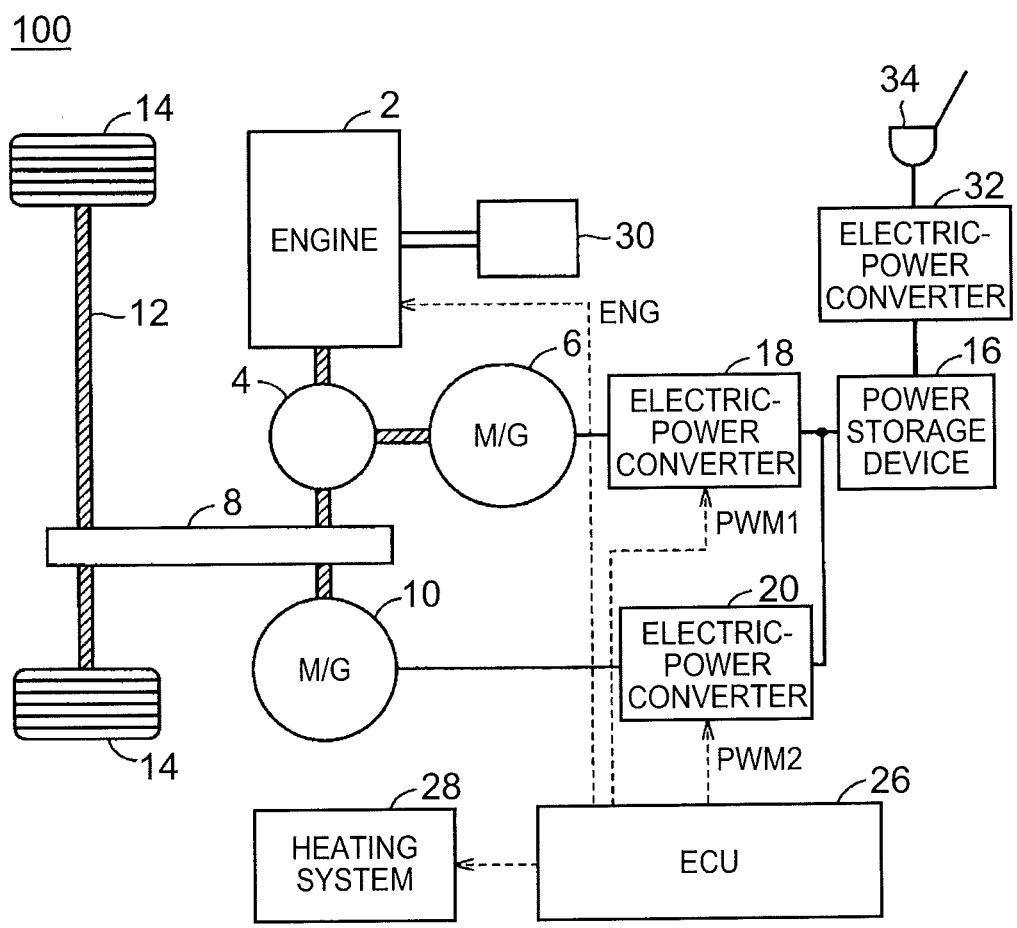
FIG. 1 is a whole block diagram of a hybrid vehicle according to Embodiment 1 of the present invention.

The following describes embodiments of the present invention in detail with reference to the attached drawings. Note that the same or equivalent portions in the drawings have the same reference sign and descriptions thereof are not repeated.

Embodiment 1

FIG. 1 is a whole block diagram of a hybrid vehicle according to Embodiment 1 of the present invention. Referring now to FIG. 1, a hybrid vehicle 100 includes an engine 2, a fuel tank 30, a power split device 4, motor generators 6, 10, a transmission gear 8, a drive shaft 12, and wheel assemblies 14. Moreover, the hybrid vehicle 100 further includes a power storage device 16, electric-power converters 18, 20, 32, an electronic control unit (hereinafter referred to as "ECU") 26, a heating system 28, and a connection section 34.

The power split device 4 is connected to the engine 2, the motor generator 6, and the transmission gear 8, so as to distribute power to them. A planet gear having three rotating shafts, for example, a sun gear, a planetary carrier, and a ring gear, is used as the power split device 4, and the three rotating shafts are connected to respective rotating shafts of the motor generator 6, the engine 2, and the transmission gear 8. A rotating shaft of the motor generator 10 is connected to the rotating shaft of the transmission gear 8. That is, the motor generator 10 and the transmission gear 8 have the same rotating shaft, and the rotating shaft is connected to the ring gear of the power split device 4.

A kinetic energy generated by the engine 2 is distributed by the power split device 4 to the motor generator 6 and the transmission gear 8. The engine 2 is incorporated in the hybrid vehicle 100 as a power source that drives the transmission gear 8 that transmits power to the drive shaft 12 and also drives the motor generator 6. The motor generator 6 is incorporated in the hybrid vehicle 100 as a member working as an electric generator driven by the engine 2 and as an electric motor that can start the engine 2. Further, the motor generator 10 is incorporated in the hybrid vehicle 100 as a power source that drives the transmission gear 8 that transmits power to the drive shaft 12.

The power storage device 16 is a direct-current power supply that is rechargeable, and is constituted by a secondary battery of nickel metal hydride, lithium ion, or the like. The power storage device 16 supplies electric power to the electric-power converters 18, 20. Further, the power storage device 16 receives electric power generated at the time of electric power generation of the motor generator(s) 6 and/or 10, so as to be charged. Furthermore, by use of the electric-power converter 32, the power storage device 16 is charged by a power supply (not shown) outside the vehicle which power supply is electrically connected to the connection section 34 (hereinafter the power supply outside the vehicle is also referred to as "external power supply," and charging of the power storage device 16 by the external power supply is also referred to as "external charging").

Note that a large-capacity capacitor can be employed as the power storage device 16, and any electric power buffer can be employed provided that the electric power buffer is able to temporarily store electric power generated by the motor generators 6, 10 and electric power from a power supply electrically connected to the connection section 34, and is able to supply the electric power thus stored to an electric load connected to the motor generators 6, 10 and the connection section 34. Note that a voltage of the power storage device 16 is, for example, around 200V.

The electric-power converter 18 converts electric power generated by the motor generator 6 into direct-current power based on a signal PWM1 received from the ECU 26, and outputs it to the power storage device 16. The electric-power converter 20 converts direct-current power supplied from the power storage device 16 into alternating-current power based on a signal PWM2 received from the ECU 26, and outputs it to the motor generator 10.

Note that the electric-power converter 18 converts direct-current power supplied from the power storage device 16 into alternating-current power at the time of starting of the engine 2, and outputs it to the motor generator 6. Further, the electric-power converter 20 converts electric power generated by the motor generator 10 into direct-current power at the time of braking of the vehicle or a reduction in acceleration speed on a descending slope, and outputs it to the power storage device 16. The electric-power converters 18, 20 are each constituted by an inverter. Note that a converter that increases input voltages of the electric-power converters 18, 20 to be not less than a voltage of the power storage device 16 may be provided between the power storage device 16 and the electric-power converters 18, 20.

The motor generators 6, 10 are each an alternating-current motor and constituted by, for example, a three-phase alternating synchronous motor in which a permanent magnet is embedded in a rotor. The motor generator 6 converts a kinetic energy generated by the engine 2 into an electrical energy, and outputs it to the electric-power converter 18. Further, the motor generator 6 generates a driving force by three-phase alternating-current power received from the electric-power converter 18, so as to perform starting of the engine 2.

The motor generator 10 generates a driving torque of the vehicle by three-phase alternating-current power received from the electric-power converter 20. Further, the motor generator 10 converts, into an electrical energy, a mechanical energy stored in the vehicle as a kinetic energy or a potential energy at the time of braking of the vehicle or a reduction in acceleration speed on a descending slope, and outputs it to the electric-power converter 20.

The engine 2 operates based on a signal ENG received from the ECU 26. The engine 2 converts a thermal energy caused due to burning of fuel into a kinetic energy of a kinetic element such as a piston or a rotor, and outputs the kinetic energy thus converted, to the power split device 4. For example, if the kinetic element is a piston and its motion is a reciprocating motion, the reciprocating motion is converted into a rotational motion via a so-called crank mechanism, and a kinetic energy of the piston is transmitted to the power split device 4. The fuel tank 30 stores fuel to be supplied to the engine 2.

The electric-power converter 32 converts electric power from the external power supply electrically connected to the connection section 34, into a voltage level of the power storage device 16, and outputs it to the power storage device 16. Note that the electric-power converter 32 may convert at least one of electric power stored in the power storage device 16 and electric power generated by the motor generator 6 by use of an output of the engine 2, into a voltage level of the electric load (not shown) electrically connected to the connection section 34, so that the electric power can be output to the connection section 34.

The heating system 28 heats a passenger compartment of the hybrid vehicle 100. The heating system 28 is able to use, in a switching manner, heating that uses the engine 2 under operation as a heat source or heating using a heat pump without using the engine 2 as the heat source, or to use both at the same time. A configuration of the heating system 28 will be described later in detail.

The ECU 26 includes a CPU (Central Processing Unit), a storage device, an input and output buffer, etc. (which are not shown herein), and controls each device in the hybrid vehicle 100. Note that the control is not limited to a process by software, but can be processed by exclusive hardware (an electronic circuit).

When requested power for the vehicle is small and efficiency of the engine 2 decreases during vehicle stop, low-speed running, or the like, the ECU 26 stops the engine 2 and controls the electric-power converter 20 so as to perform running only by use of the motor generator 10 (hereinafter referred to as "EV running"). When requested power increases and the engine 2 can be run efficiently, the ECU 26 controls the engine 2 and the electric-power converters 18, 20 so as to start the engine 2 and perform running by use of the engine 2 and the motor generator 10 (hereinafter referred to as "HV running").

Further, when a state of charge (hereinafter referred to as "SOC") of the power storage device 16 becomes less than a predetermined target, the ECU 26 controls the engine 2 and the electric-power converter 18 so as to charge the power storage device 16 by causing the motor generator 6 to generate electric power by use of an output from the engine 2. Further, at the time of braking of the vehicle or a reduction in acceleration speed on a descending slope, the ECU 26 controls the electric-power converter 20 so that regenerative power generation is performed by the motor generator 10.

Further, when external charging is requested, the ECU 26 controls the electric-power converter 32 so as to convert electric power input from the connection section 34, into a charging voltage for the power storage device 16, and to output it to the power storage device 16. For example, when a connection of a charger cable to the connection section 34 is detected or when input means for instructing a request of external charging is operated by a user, it can be assumed that the external charging is requested.

Further, the ECU 26 detects deterioration of fuel stored in the fuel tank 30. As described above, since the hybrid vehicle 100 is able to perform the EV running in which the engine 2 is stopped, fuel efficiency is improved in comparison with a conventional vehicle that uses only an engine as a driving source, but there is a concern that the fuel deteriorates due to the fuel being left in the fuel tank 30 for a long term. Particularly, the hybrid vehicle 100 in which external charging is performable is able to perform the EV running by use of electric power supplied from the external power supply and stored in the power storage device 16, and therefore, the concern about deterioration of the fuel further increases.

In view of this, in Embodiment 1, when deterioration of the fuel stored in the fuel tank 30 is detected, the ECU 26 controls the heating system 28 and the engine 2 so that the heating system 28 gives priority to heating using the engine 2 as a heat source (hereinafter referred to as "engine heating") over heating using a heat pump (hereinafter referred to as "heat-pump heating").

More specifically, in a case where execution of the heating is requested during the EV running (engine stopping), when deterioration of the fuel is detected, the ECU 26 starts the engine 2 and performs the engine heating using the engine 2 as a heat source. Note that the heat-pump heating is stopped basically, but when powerful heating is requested, the heat-pump heating may be operated together. That is, to give "priority" to the engine heating over the heat-pump heating may be such that, in addition to operating the engine heating while stopping the heat-pump heating, the heat-pump heating may be operated according to an ability for heating while operating the engine heating.

In a case where execution of heating is requested during the EV running, if deterioration of the fuel is not detected, the ECU 26 operates the heat-pump heating. This is because if the fuel does not deteriorate, it is not necessary to start the engine 2 for heating, and the heat-pump heating is more effective. When execution of heating is requested during the HV running, the ECU 26 operates the engine heating and stops the heat-pump heating because the engine 2 operates. This is because, when the engine 2 operates, it is effective to use its waste heat for heating.

Figure 2:
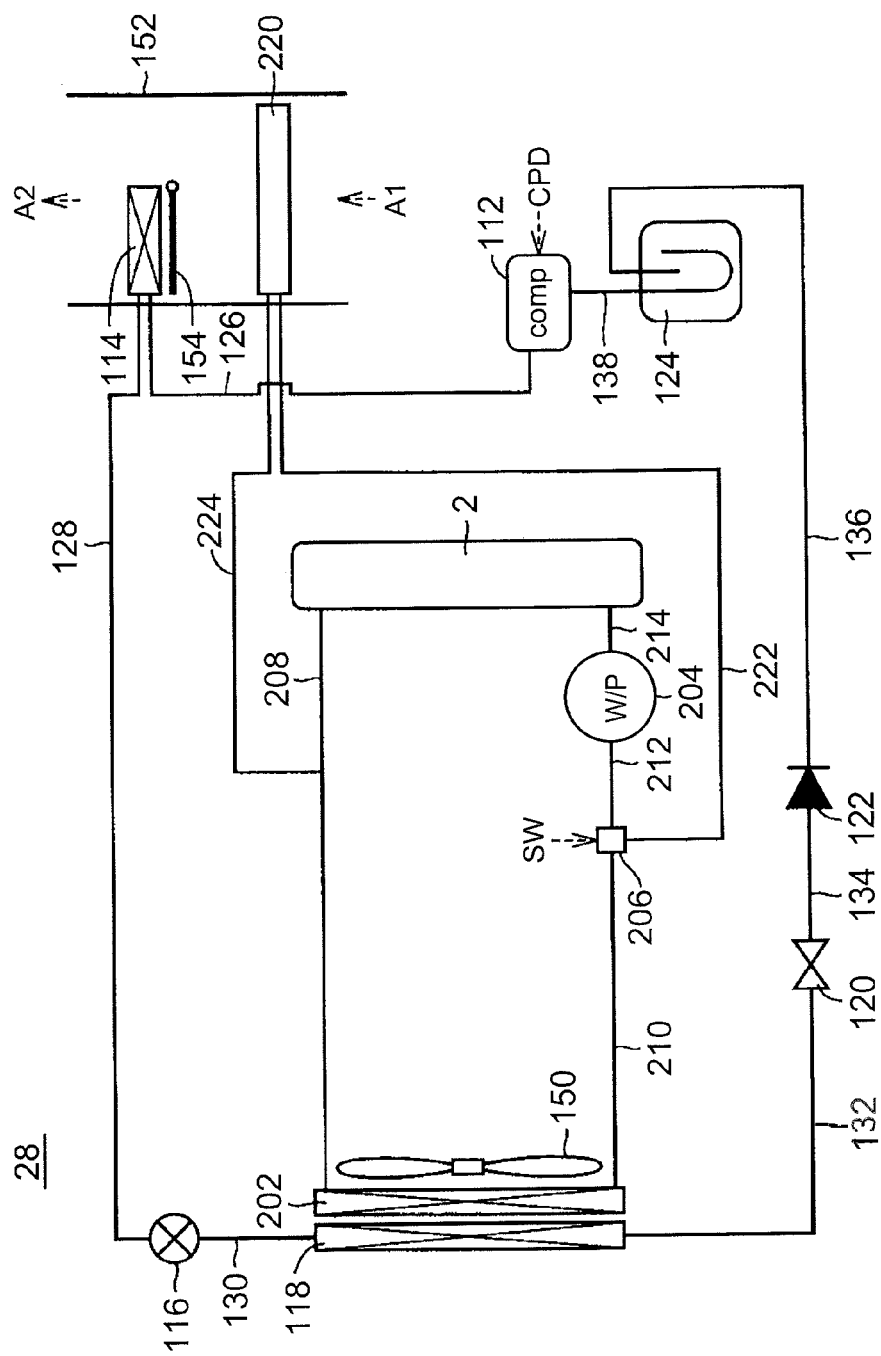
FIG. 2 is a configuration diagram of a heating system illustrated in FIG. 1.

FIG. 2 is a configuration diagram of the heating system 28 illustrated in FIG. 1. Referring now to FIG. 1 with FIG. 2, the heating system 28 includes a compressor 112, an indoor heat exchanger 114, an expansion valve 116 as an example of a reducer, an outdoor heat exchanger 118, a solenoid valve 120, a check valve 122, an accumulator 124, and refrigerant passages 126 to 138.

The compressor 112 operates by receiving driving electric power from the power storage device 16 based on a signal CPD from the ECU 26. Instead of the power storage device 16, electric power from an auxiliary power supply (not shown) may be used. The compressor 112 inhales refrigerant, compresses the refrigerant adiabatically into overheating refrigerant gas, and discharges high-temperature and high-pressure gas-phase refrigerant. The compressor 112 circulates the refrigerant to a heat pipe cycle by inhaling and discharging the refrigerant.

Each of the indoor heat exchanger 114 and the outdoor heat exchanger 118 includes a tube and a fin provided on an outer peripheral surface of the tube, and exchanges heat between the refrigerant circulating through the tube and its ambient air. A fan 150 is provided so as to supply a flow of air to the outdoor heat exchanger 118, and the fan 150 receives a driving force from a motor (not shown) and rotates so as to generate the flow of the air. The heat exchange between the refrigerant in the outdoor heat exchanger 118 and the air is promoted by forced draft from the fan 150.

The hybrid vehicle 100 is provided with a duct 152. The duct 152 communicates with the passenger compartment. The indoor heat exchanger 114 is disposed inside the duct 152 so as to supply air for air conditioning into the passenger compartment. In the duct 152, a damper 154 is disposed in a direct upstream of a flow of the air for air conditioning relative to the indoor heat exchanger 114. The damper 154 adjusts a flow rate of the air for air conditioning that flows into the indoor heat exchanger 114 so as to adjust an amount of heat exchange between the refrigerant in the indoor heat exchanger 114 and the air for air conditioning.

The expansion valve 116 inflates high-pressure liquid-phase refrigerant by injecting it from a small hole, so as to decrease a pressure of the refrigerant liquid, thereby changing the refrigerant liquid into wet steam in a low-temperature and low-pressure gas-liquid mixture state. The expansion valve 116 may be a thermostatic expansion valve that changes an opening according to a temperature of the refrigerant, or may be an electric expansion valve. Further, a reducer to decrease the pressure of the refrigerant liquid is not limited to the expansion valve 116 that performs throttle expansion, but may be a capillary tube.

The solenoid valve 120 is a solenoid valve that is switchable between a fully opening state and a fully closing state. At the time of operating the compressor 112, the solenoid valve 120 is set to the fully opening state, and at the time of stopping the compressor 112, the solenoid valve 120 is set to the fully closing state. A pair of pipes are connected to the check valve 122. The check valve 122 allows a flow of the refrigerant to flow from one of the pair of pipes to the other one of the pair of pipes through the check valve 122, and prohibits a flow of the refrigerant to flow from the other one of the pair of pipes to the one of the pair of pipes through the check valve 122.

The accumulator 124 is disposed in an upstream of a refrigerant flow relative to the compressor 112. The accumulator 124 separates the liquid-phase refrigerant from the gas-phase refrigerant, and causes the compressor 112 to inhale only gaseous refrigerant. If liquid refrigerant is introduced into the compressor 112, a component part of the compressor 112, such as a valve, may be damaged by compression of the liquid. In view of this, when the accumulator 124 is provided in the upstream relative to the compressor 112, it is possible to restrain damage on the compressor 112 and to improve reliability of the heating system 28.

The refrigerant passage 126 is disposed between the compressor 112 and the indoor heat exchanger 114. The refrigerant passage 128 is disposed between the indoor heat exchanger 114 and the expansion valve 116. The refrigerant passage 130 is disposed between the expansion valve 116 and the outdoor heat exchanger 118. The refrigerant passage 132 is disposed between the outdoor heat exchanger 118 and the solenoid valve 120. The refrigerant passage 134 is disposed between the solenoid valve 120 and the check valve 122. The refrigerant passage 136 is disposed between the check valve 122 and the accumulator 124. The refrigerant passage 138 is disposed between the accumulator 124 and the compressor 112.

Further, the heating system 28 includes a radiator 202, a cooling-water pump 204, a valve 206, a heater core 220, and cooling-water passages 208 to 214, 222, 224. An engine cooling device that cools off the engine 2 is constituted by the radiator 202, the cooling-water pump 204, and the outdoor heat exchanger 118. The engine cooling device cools off the engine 2 by circulating cooling water to the engine 2. The cooling water is a heat transmitting medium that takes heat from the engine 2 to cool off the engine 2. The engine 2 has a function as a heat source that adds heat to the cooling water. The engine cooling device has a function as a circulation device in which the cooling water circulates.

The radiator 202 is disposed in a path of an air flow caused by an operation of the fan 150. The radiator 202 is disposed in an upstream of the air flow caused by the fan 150, relative to the outdoor heat exchanger 118. The radiator 202 includes a tube and a fin provided on an outer peripheral surface of the tube. In the radiator 202, heat is released to ambient air from the cooling water circulating in the tube, and the cooling water exchanges heat with the air so as to be cooled off. A surface area of the radiator 202 increases by the fin, and further, an air flow is caused around the radiator 202 due to the forced draft of the fan 150. Hereby, heat dissipation from the cooling water in the radiator 202 is promoted. The cooling-water pump 204 transfers the cooling water so as to circulate the cooling water in the engine cooling device.

The valve 206 is provided so as to supply the cooling water of the engine cooling device to the heater core 220. The valve 206 flows the cooling water of the engine cooling device to the heater core 220 upon receipt of a signal SW from the ECU 26. The heater core 220 is disposed within the duct 152. The heater core 220 has a structure in which heat is exchangeable between the engine cooling water flowing through the heater core 220 and the air for air conditioning.

The cooling-water passage 208 is disposed between the engine 2 and the radiator 202. The cooling-water passage 210 is disposed between the radiator 202 and the valve 206. The cooling-water passage 212 is disposed between the valve 206 and the cooling-water pump 204. The cooling-water passage 214 is disposed between the cooling-water pump 204 and the engine 2. The cooling-water passage 222 is disposed between the valve 206 and the heater core 220. The cooling-water passage 224 is disposed between the heater core 220 and the cooling-water passage 208.

The heating system 28 is able to use, in a switching manner, the engine heating using the heater core 220 connected to the engine cooling device with the engine 2 under operation being used as a heat source, or the heat-pump heating using a heat pump cycle constituted by the compressor 112, the indoor heat exchanger 114, the outdoor heat exchanger 118, etc., or to use both at the same time.

By flowing the engine cooling water flowing through the engine cooling device, from the valve 206 to the heater core 220 based on the signal SW from the ECU 26, it is possible to perform the engine heating using the engine 2 under operation as a heat source. Further, by driving the compressor 112 based on the signal CPD from the ECU 26, it is possible to perform the heat-pump heating that does not use the engine 2 as a heat source.

Figure 3:
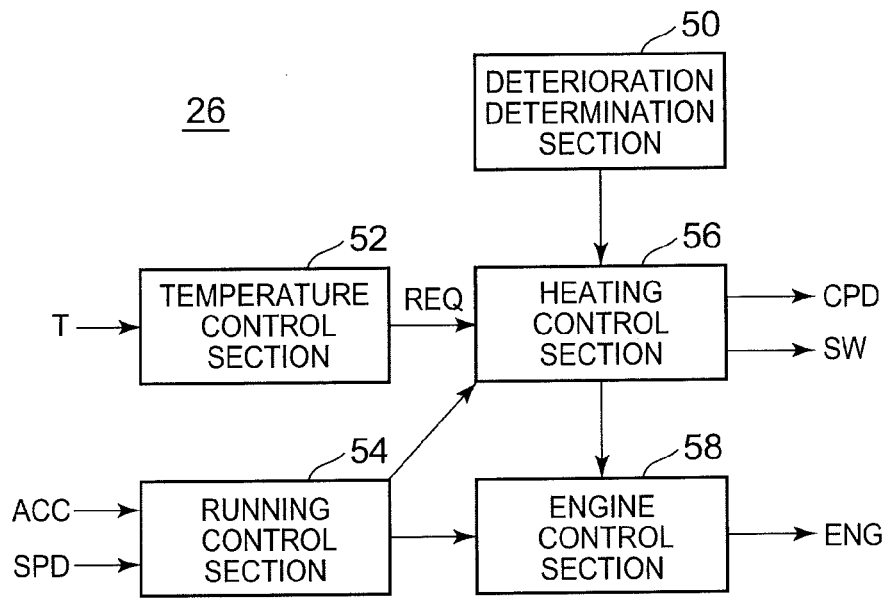
FIG. 3 is a block diagram illustrating a configuration of that part of an ECU illustrated in FIG. 1 which is related to a heating control using the heating system in terms of function.

FIG. 3 is a block diagram illustrating a configuration of that part of the ECU 26 illustrated in FIG. 1 which is related to a heating control using the heating system 28 in terms of function. Referring now to FIG. 3, the ECU 26 includes a fuel deterioration determination section 50, a temperature control section 52, a running control section 54, a heating control section 56, and an engine control section 58.

The fuel deterioration determination section 50 determines whether or not the fuel stored in the fuel tank 30 (FIG. 1) deteriorates. In Embodiment 1, when refueling is not performed and a stop state of the engine 2 continues for a predetermined period, it is determined that the fuel deteriorates. Note that a sensor for detecting a property (e.g., an oxidation state) of the fuel stored in the fuel tank 30 may be provided so as to determine deterioration of the fuel based on a detection value of the sensor.

The temperature control section 52 performs a temperature control in the passenger compartment. When a temperature T in the passenger compartment is less than a set range, the temperature control section 52 outputs a heating request signal REQ to the heating control section 56.

Figure 4:
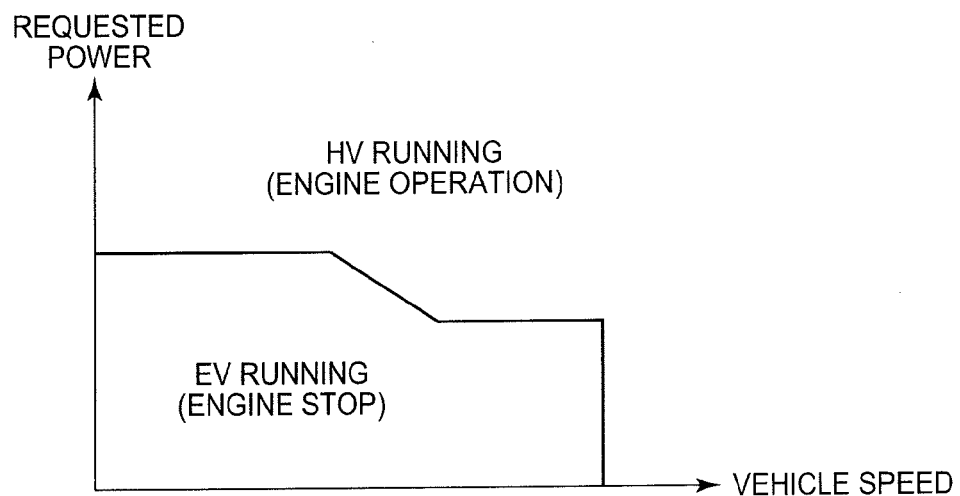
FIG. 4 is a view illustrating an engine starting threshold.

The running control section 54 performs a control related to running of the vehicle. Typically, the running control section 54 controls a running mode (HV running/EV running) of the vehicle. More specifically, the running control section 54 calculates a requested power to the vehicle based on an accelerator opening ACC, a vehicle speed SPD, and the like according to an operation amount of an accelerator pedal (not shown). Then, as illustrated in FIG. 4, when the requested power exceeds a predetermined engine starting threshold, the running control section 54 sets the running mode to the HV running and notifies the heating control section 56 of it. If the engine 2 stops, the running control section 54 notifies the engine control section 58 to start the engine 2. When the requested power is less than the predetermined engine starting threshold, the running control section 54 sets the running mode to the EV running and notifies the heating control section 56 of it. If the engine 2 operates, the running control section 54 notifies the engine control section 58 to stop the engine 2.

Again referring to FIG. 3, the heating control section 56 receives a determination result about deterioration of the fuel by the fuel deterioration determination section 50. Further, the heating control section 56 receives a heating request signal REQ output from the temperature control section 52 and further receives a notification of the running mode from the running control section 54. Then, the heating control section 56 controls operations of the engine heating and the heat-pump heating in the heating system 28 by the after-mentioned method based on these various signals.

When the heat-pump heating is performed, the heating control section 56 outputs, to the compressor 112, the signal CPD to instruct the operation of the compressor 112 (FIG. 2). Meanwhile, when the engine heating is performed, the heating control section 56 outputs, to the valve 206 (FIG. 2), the signal SW to control the valve 206 to flow the engine cooling water to the heater core 220 (FIG. 2). Further, in a case where the engine heating is performed, if the engine 2 stops (e.g., during the EV running), the heating control section 56 outputs, to the engine control section 58, a starting request of the engine 2.

Upon receipt of the starting request of the engine 2 from the running control section 54 or the heating control section 56, the engine control section 58 generates a signal ENG to operate the engine 2, and outputs it to the engine 2.

Figure 5:
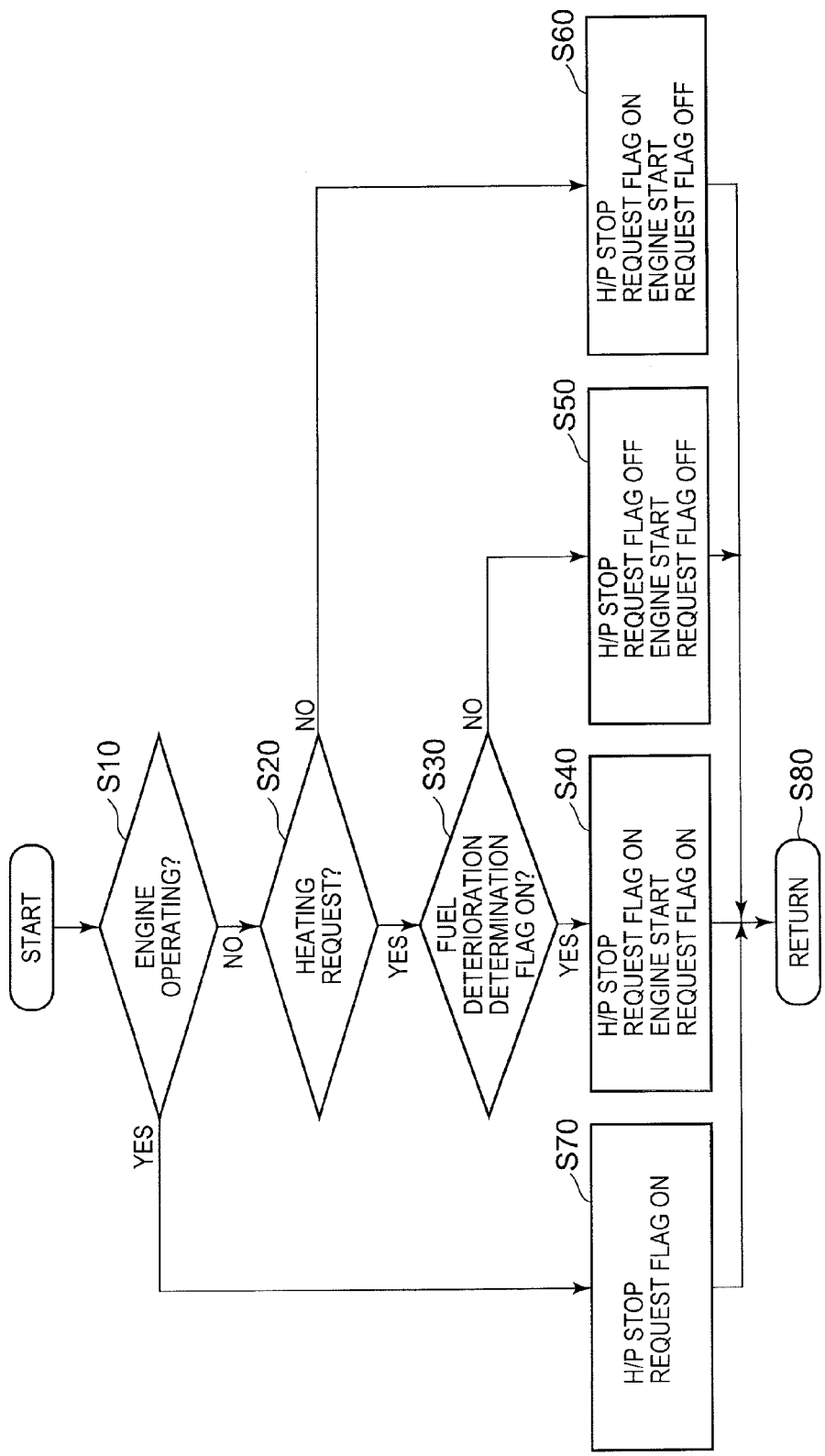
FIG. 5 is a flow chart to describe a procedure of the heating control executed by the ECU.

FIG. 5 is a flow chart to describe a procedure of the heating control executed by the ECU 26. Note that this flow chart is implemented such that a program stored in advance is read from a main routine and executed. Alternatively, it is also possible to implement the process by building exclusive hardware (an electronic circuit) for all or part of steps thereof.

Referring now to FIG. 5, the ECU 26 determines whether or not the engine 2 is under operation (step S10). When it is determined that the engine 2 stops (NO in step S10), the ECU 26 determines whether or not there is a heating request (step S20). Here, when heating is requested by a user and the temperature T in the passenger compartment is less than the predetermined range, it is determined that there is a heating request.

When it is determined that there is a heating request in step S20 (YES in step S20), the ECU 26 determines whether or not a fuel deterioration determination flag is ON (step S30). The fuel deterioration determination flag is a flag indicative of whether or not the fuel in the fuel tank 30 (FIG. 1) deteriorates, and ON/OFF is processed according to the after-mentioned fuel deterioration determination process.

When it is determined that the fuel deterioration determination flag is ON in step S30 (YES in step S30), the ECU 26 turns on a heat-pump (H/P) stop request flag for requesting an operation stop of the heat-pump heating, and turns on an engine start request flag for requesting starting of the engine 2 (step S40). Hereby, the engine 2 is started, and the engine heating using the engine 2 under operation as a heat source is performed in the heating system 28. As a result, while the heating is performed, the fuel that deteriorates is used.

When it is determined that the fuel deterioration determination flag is OFF in step S30 (NO in step S30), the ECU 26 turns off the heat-pump (H/P) stop request flag, and turns off the engine start request flag (step S50). Hereby, the heat-pump heating that does not use the engine 2 as a heat source is performed in the heating system 28. That is, if the fuel does not deteriorate, it is not necessary to operate the engine 2 to use the fuel actively, and thus, the heat-pump heating is performed.

Meanwhile, when it is determined that there is no heating request in step S20 (NO in step S20), the ECU 26 turns on the heat-pump (H/P) stop request flag, and turns off the engine start request flag (step S60). That is, in this case, neither the engine heating nor the heat-pump heating is performed.

Note that, when it is determined that the engine 2 is under operation in step S10 (YES in step S10), the ECU 26 turns on the heat-pump (H/P) stop request flag (step S70). The reason is as follows: when the engine 2 is under operation (e.g., during the HV running), it is possible to perform the engine heating using heat of the engine 2 and it is not necessary to daringly operate the heat-pump heating. Note that, when powerful heating is requested, the engine heating and the heat-pump heating may be performed together.

Figure 6:
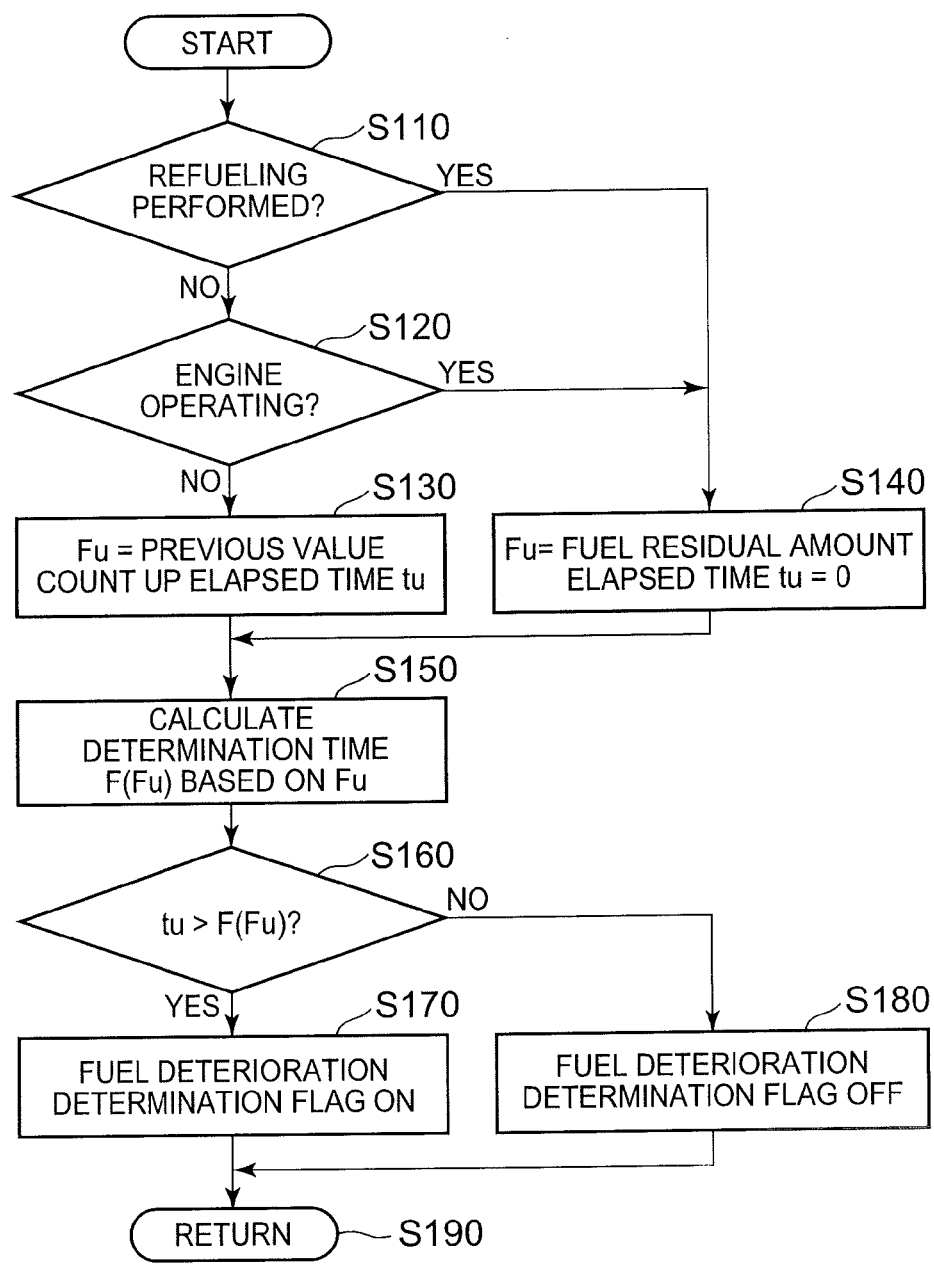
FIG. 6 is a flow chart to describe a procedure of a fuel deterioration determination process executed by the ECU.

FIG. 6 is a flow chart to describe a procedure of the fuel deterioration determination process executed by the ECU 26. Note that this flow chart is also implemented such that a program stored in advance is read from a main routine and executed. Alternatively, it is also possible to implement the process by building exclusive hardware (an electronic circuit) for all or part of steps thereof.

Referring now to FIG. 6, the ECU 26 determines whether or not refueling to the fuel tank 30 is being performed (step S110). When it is determined that the refueling is being performed (YES in step S110), the ECU 26 substitutes a value of a fuel residual amount in the fuel tank 30 into a fuel amount Fu to be subjected to the fuel deterioration determination, and resets, to zero, an elapsed time tu to be used for determination on fuel deterioration (step S140).

When it is determined that the refueling is not being performed in step S110 (NO in step S110), the ECU 26 determines whether or not the engine 2 is under operation (step S120). When it is determined that the engine 2 is under operation (YES in step S120), the ECU 26 advances the process to step S140.

When it is determined that the engine 2 stops in step S120 (NO in step S120), the ECU 26 sets the fuel amount Fu to a previous value and counts up the elapsed time tu (step S130). That is, in steps S110 to S140, a fuel amount and a duration time of a state where no refueling is performed and the engine 2 stops (a state where neither refueling nor fuel consumption is performed, and the fuel is left in the fuel tank 30) are measured.

Subsequently, the ECU 26 calculates a determination time F(Fu) before the fuel is determined to deteriorate, based on the fuel amount Fu (step S150).

Figure 7:
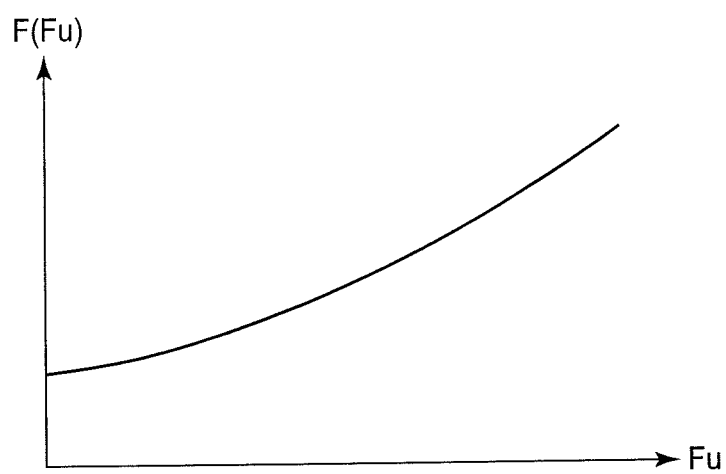
FIG. 7 is a view illustrating an exemplary relationship between a fuel amount and a determination time.

FIG. 7 is a view illustrating an exemplary relationship between the fuel amount Fu and the determination time F(Fu). Referring now to FIG. 7, as the fuel amount Fu is larger, the determination time F(Fu) before the fuel is determined to deteriorate is set to be longer. This is because it is considered that the fuel can more endure deterioration as more fuel is left in the fuel tank 30.

Again referring to FIG. 6, when the determination time F(Fu) is calculated in step S150, the ECU 26 determines whether or not the elapsed time tu exceeds the determination time F(Fu) (step S160). When it is determined that the elapsed time tu exceeds the determination time F(Fu) (YES in step S160), the ECU 26 turns on the fuel deterioration determination flag (step S170). When the elapsed time tu is not more than the determination time F(Fu) (NO in step S160), the ECU 26 turns off the fuel deterioration determination flag (step S180).

Thus, it is determined whether or not the fuel in the fuel tank 30 deteriorates, and based on a determination result thereof, the operations of the engine heating and the heat-pump heating in the heating system 28 are controlled.

As described above, according to Embodiment 1, when deterioration of the fuel in fuel tank 30 is detected, the engine heating using the engine 2 under operation as a heat source is given priority over the heat-pump heating that does not use the engine 2 as a heat source, thereby making it possible to satisfy a user request to restrain deterioration of the fuel while heating is performed. As a result, marketability of the hybrid vehicle 100 improves.

Embodiment 2

Again referring to FIG. 5, in Embodiment 1, when deterioration of the fuel is detected, the engine heating is performed, and when deterioration of the fuel is not detected, the heat-pump heating is performed (steps S30 to S50).

In Embodiment 2, when deterioration of fuel is detected, engine heating is performed, and when deterioration of the fuel is not detected, efficient one of the engine heating and the heat-pump heating is selected. In Embodiment 2, at the time of HV running in which a vehicle requested power is large and running is performed by operating an engine 2, it is determined that the engine heating using heat of the engine 2 under operation is more efficient than the heat-pump heating, and the engine heating is performed. Meanwhile, at the time of EV running in which running is performed while the engine 2 is stopped, it is determined that the heat-pump heating is more efficient than the engine heating, and the heat-pump heating is performed.

An overall configuration of a hybrid vehicle and a configuration of a heating system according to Embodiment 2 are respectively the same as the hybrid vehicle 100 and the heating system 28 according to Embodiment 1. Further, a function configuration of an ECU in Embodiment 2 is the same as the ECU 26 in Embodiment 1 illustrated in FIG. 3.

Figure 8:
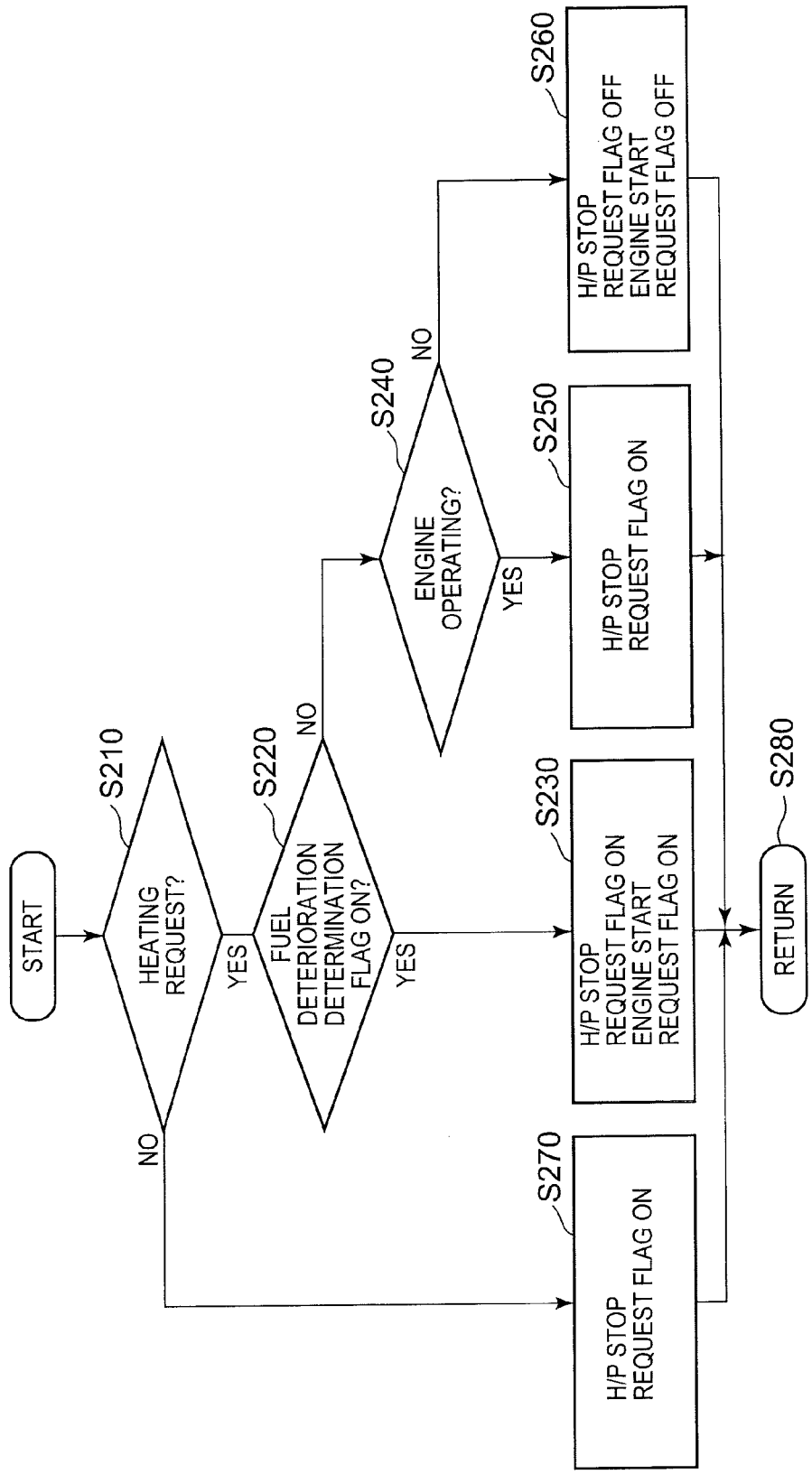
FIG. 8 is a flow chart to describe a procedure of a heating control executed by an ECU according to Embodiment 2.

FIG. 8 is a flow chart to describe a procedure of a heating control executed by an ECU 26 according to Embodiment 2. Note that this flow chart is also implemented such that a program stored in advance is read from a main routine and executed. Alternatively, it is also possible to implement the process by building exclusive hardware (an electronic circuit) for all or part of steps thereof.

Referring now to FIG. 8, in Embodiment 2, the ECU 26 initially determines whether or not there is a heating request (step S210). Even here, when heating is requested by a user and a temperature in a passenger compartment is less than a predetermined range, it is determined that there is a heating request.

When it is determined that there is a heating request in step S210 (YES in step S210), the ECU 26 determines whether or not a fuel deterioration determination flag is ON (step S220). Even for the fuel deterioration determination flag, ON/OFF is processed according to the aforementioned fuel deterioration determination process illustrated in FIG. 6.

When it is determined that the fuel deterioration determination flag is ON in step S220 (YES in step S220), the ECU 26 turns on a heat-pump (H/P) stop request flag, and turns on an engine start request flag (step S230). Hereby, the engine 2 is started, and engine heating using the engine 2 under operation as a heat source is performed in a heating system 28.

Meanwhile, when it is determined that the fuel deterioration determination flag is off (NO in step S220), the ECU 26 determines whether or not the engine 2 is under operation (step S240). When it is determined that the engine 2 is under operation (YES in step S240), the ECU 26 determines that the engine heating using heat of the engine 2 under operation is more efficient than the heat-pump heating, and turns on the heat-pump (H/P) stop request flag (step S250).

When it is determined that the engine 2 stops in step S240 (NO in step S240), the ECU 26 determines that the heat-pump heating is more efficient than the engine heating, and then, the ECU 26 turns off the heat-pump (H/P) stop request flag and turns off the engine start request flag (step S260).

Note that, when it is determined that there is no heating request in step S210 (NO in step S210), the ECU 26 turns on the heat-pump (H/P) stop request flag (step S270).

As described above, in Embodiment 2, when deterioration of the fuel is detected, the engine heating is performed, and when deterioration of the fuel is not detected, efficient one of the engine heating and the heat-pump heating is selected. In view of this, according to Embodiment 2, it is possible to increase energy efficiency of heating by the heating system 28.

Note that, in each of Embodiments 1, 2, when the elapsed time tu indicative of the duration time of the state where neither refueling nor no fuel consumption is performed and the fuel is left in the fuel tank exceeds the predetermined determination time F(Fu), it is determined that the fuel deteriorates. However, the elapsed time tu may be taken as an indication indicative of a fuel deterioration degree, and the switching between the engine heating and the heat-pump heating may be performed according to the fuel deterioration degree.

Figure 9:
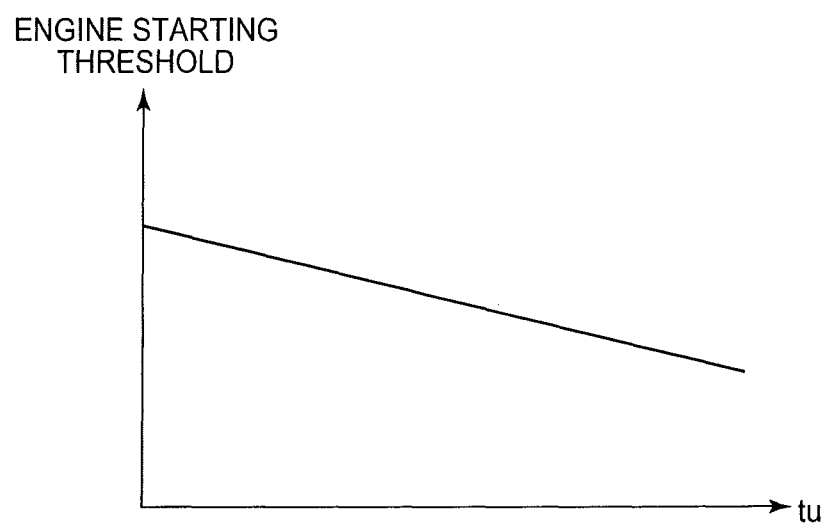
FIG. 9 is a view illustrating an example to change an engine starting threshold according to an elapsed time after refueling is performed.

More specifically, as the elapsed time tu is larger, that is, the fuel deterioration degree is larger, the engine heating may be given priority over the heat-pump heating. For example, as illustrated in FIG. 9, when the engine starting threshold is set so as to become smaller as the elapsed time tu is larger, it is possible to cause the engine 2 to start easily and the engine heating to be selected easily, as the fuel deterioration degree is larger.

Further, in the above description, deterioration of the fuel is determined or the fuel deterioration degree is detected based on the elapsed time tu after refueling is performed, but a sensor for detecting a property (e.g., an oxidation state) of the fuel stored in the fuel tank 30 may be provided so as to directly determine the fuel deterioration degree.

Further, in the above description, the hybrid vehicle 100 is configured such that the power storage device 16 is changeable from an external power supply by connecting the external power supply to the connection section 34 (FIG. 1), but a technique of external charging is not limited to such a plug-in method. For example, a power transmission section of the external power supply and a power receiving section of the vehicle may be constituted respectively by coils or the like, so that electric power transmission may be performed from the external power supply to the vehicle via an electromagnetic field in a non-contact manner.

Further, the present invention is suitable for the aforementioned hybrid vehicle in which fuel can be left for a long term and external charging is performable, but is also applicable to a hybrid vehicle that does not have an external charging function.

Further, in the above description, the heating system 28 includes the heat-pump heating as heating that does not use the engine 2 as a heat source, but the heating that does not use the engine 2 as a heat source is not limited to the heat-pump heating. For example, a heating wire heater such as a PTC (Positive Temperature Coefficient) heater may be used.

Further, in the above description, the hybrid vehicle 100 is a series/parallel vehicle in which power of the engine 2 is distributed by the power split device 4 so as to be transmitted to the drive shaft 12 and the motor generator 6, but the present invention is also applicable to hybrid vehicles of the other types. For example, the present invention is also applicable to a so-called series hybrid vehicle in which an engine 2 is used to drive a motor generator 6 and a driving force of a vehicle is generated only by a motor generator 10, a hybrid vehicle in which only a regenerative energy in a kinetic energy generated by an engine is recovered as an electric energy, a motor assist hybrid vehicle in which an engine is used as a main power and a motor that assists the engine as needed, and the like vehicles.

Note that, in the above description, the engine 2 corresponds to one example of an "internal combustion engine" in the present invention, and the fuel deterioration determination section 50 corresponds to one example of a "detection section" in the present invention. Further, that part of the heating system 28 which realizes the engine heating corresponds to one example of a "first heating apparatus" in the present invention, and that part of the heating system 28 which realizes the heat-pump heating corresponds to one example of a "second heating apparatus" in the present invention.

The embodiments described herein are examples in all respects, and should not be considered limitative. A scope of the present invention is shown by Claims, not by the descriptions of the above embodiments, and intended to include every modification made within the meaning and scope equivalent to Claims.

What is claimed is:

1. A hybrid vehicle comprising:
an electric motor configured to generate a running driving force;
an internal combustion engine;
a heating system configured to heat a passenger compartment, the heating system including a first heating apparatus that is configured to use the internal combustion engine under operation as a heat source, and a second heating apparatus that is configured not to use the internal combustion engine as a heat source; and
an electronic control unit configured to:
(a) detect deterioration of fuel to be supplied to the internal combustion engine, and
(b) control the electric motor, the internal combustion engine, and the heating system, such that, when the electronic control unit detects the deterioration of the fuel, the electronic control unit controls the heating system and the internal combustion engine so as to give priority to heating by the first heating apparatus over heating by the second heating apparatus.

2. The hybrid vehicle according to claim 1, wherein when the electronic control unit detects the deterioration of the fuel during stopping of the internal combustion engine, the electronic control unit controls the heating system and the internal combustion engine so as to start the internal combustion engine and give priority to the heating by the first heating apparatus over the heating by the second heating apparatus.

3. The hybrid vehicle according to claim 1, wherein the electronic control unit detects a fuel deterioration degree; and
when the fuel deterioration degree is large, the electronic control unit controls the heating system and the internal combustion engine so as to give more priority to the heating by the first heating apparatus over the heating by the second heating apparatus, in comparison with a case where the fuel deterioration degree is small.

4. The hybrid vehicle according to claim 3, wherein the electronic control unit detects the fuel deterioration degree based on an elapsed time after refueling is performed.

5. The hybrid vehicle according to claim 1, wherein as more fuel remains, the electronic control unit lengthens time before the electronic control unit detects the deterioration of the fuel.

6. The hybrid vehicle according to claim 1, wherein when the deterioration of the fuel is not detected by the electronic control unit, the electronic control unit controls the heating system and the internal combustion engine so as to use efficient one of the heating by the first heating apparatus and the heating by the second heating apparatus.

7. The hybrid vehicle according to claim 6, wherein when the internal combustion engine operates, the electronic control unit determines that the heating by the first heating apparatus is more efficient than the heating by the second heating apparatus.

8. The hybrid vehicle according to claim 6, wherein
when the internal combustion engine stops, the electronic control unit determines that the heating by the second heating apparatus is more efficient than the heating by the first heating apparatus.

9. The hybrid vehicle according to claim 1, wherein
when a request output to the vehicle exceeds a predetermined threshold, the internal combustion engine operates;
the electronic control unit is configured such that, when the internal combustion engine operates, the electronic control unit controls the heating system and the internal combustion engine so as to give priority to the heating by the first heating apparatus over the heating by the second heating apparatus, and when the internal combustion engine stops, the electronic control unit controls the heating system so as to give priority to the heating by the second heating apparatus over the heating by the first heating apparatus; and
the electronic control unit detects a fuel deterioration degree, so that when the fuel deterioration degree is large, the electronic control unit sets the threshold to be smaller than the threshold at the time when the fuel deterioration degree is small.

10. The hybrid vehicle according to claim 1, wherein
the second heating apparatus performs heating by use of a heat pump.

11. The hybrid vehicle according to claim 1, further comprising:
a power storage device configured to store electric power to be supplied to the electric motor; and
a charging device configured to receive electric power from a power supply outside the vehicle and charges the power storage device.

* * * * *